United States Patent
Hara et al.

(10) Patent No.: US 9,914,252 B2
(45) Date of Patent: Mar. 13, 2018

(54) MOLDING DIE, OPTICAL ELEMENT MANUFACTURING METHOD, AND OPTICAL ELEMENT

(71) Applicant: KONICA MINOLTA, INC., Chiyoda-ku (JP)

(72) Inventors: Shinichiro Hara, Hachioji (JP); Dai Akutsu, Inagi (JP); Hajime Mori, Fuchu (JP)

(73) Assignee: Konica Minolta, Inc., Tokyo (JP)

(*) Notice: Subject to any disclaimer, the term of this patent is extended or adjusted under 35 U.S.C. 154(b) by 393 days.

(21) Appl. No.: 14/429,313

(22) PCT Filed: Sep. 5, 2013

(86) PCT No.: PCT/JP2013/073984
§ 371 (c)(1),
(2) Date: Mar. 18, 2015

(87) PCT Pub. No.: WO2014/045891
PCT Pub. Date: Mar. 27, 2014

(65) Prior Publication Data
US 2015/0246473 A1 Sep. 3, 2015

(30) Foreign Application Priority Data
Sep. 18, 2012 (JP) ................. 2012-204241

(51) Int. Cl.
*B29C 45/40* (2006.01)
*G02B 3/00* (2006.01)
(Continued)

(52) U.S. Cl.
CPC ...... *B29C 45/4005* (2013.01); *B29C 45/2708* (2013.01); *B29C 45/38* (2013.01);
(Continued)

(58) Field of Classification Search
CPC . B29C 45/2708; B29C 45/38; B29C 45/4005; B29C 45/401; B29D 11/0048
(Continued)

(56) References Cited

U.S. PATENT DOCUMENTS 2,233,057 A * 2/1941 Luce ................. C03B 11/08
164/319
2,443,826 A * 6/1948 Johnson ............ B29C 45/4005
164/344
(Continued)

FOREIGN PATENT DOCUMENTS

JP 58-224303 12/1983
JP 7-25107 3/1995
(Continued)

*Primary Examiner* — Yogendra N Gupta
*Assistant Examiner* — Emmanuel S Luk
(74) *Attorney, Agent, or Firm* — Cozen O'Connor

(57) ABSTRACT

Technique to provide a molding die which can easily release a minute optical element in a state of favorable surface accuracy, while bending or rupture of a gate portion attached to the optical element is prevented. By making a first outer circumferential transfer surface 21A of a fixed die 20 and a first gate-forming surface 31A flush with each other, a notch shape is not formed on a portion M1 connecting an outer circumferential portion FL on the fixed die 20 side and a gate portion GP. Furthermore, by pushing out the runner portion RP at the same angle as a taper angle α of a side-surface transfer surface 23A on a second gate-forming surface 32A side, bending deformation or the like of the gate portion GP which can occur when being pushed out to a direction perpendicular to a mold mating surface PL1 can be prevented.

8 Claims, 9 Drawing Sheets

(51) Int. Cl.
*B29D 11/00* (2006.01)
*B29C 45/27* (2006.01)
*B29C 45/38* (2006.01)
*B29L 11/00* (2006.01)

(52) U.S. Cl.
CPC .......... *B29D 11/00413* (2013.01); *G02B 3/00* (2013.01); *B29C 45/401* (2013.01); *B29L 2011/0016* (2013.01)

(58) Field of Classification Search
USPC .......................... 425/808, DIG. 58; 264/1.32
See application file for complete search history.

(56) References Cited

U.S. PATENT DOCUMENTS

| | | | | |
|---|---|---|---|---|
| 2,516,373 | A * | 7/1950 | Ehlert | B29C 33/0022 249/110 |
| 4,008,031 | A * | 2/1977 | Weber | B29C 45/2669 264/2.2 |
| 4,540,534 | A * | 9/1985 | Grendol | B29C 45/2669 249/82 |
| 4,664,854 | A * | 5/1987 | Bakalar | B29C 45/561 264/2.2 |
| 4,900,242 | A * | 2/1990 | Maus | B29C 45/263 264/328.7 |
| 5,137,442 | A * | 8/1992 | Starkey | B29C 33/442 249/66.1 |
| 5,545,366 | A * | 8/1996 | Lust | B29C 33/306 264/2.5 |
| 5,560,939 | A * | 10/1996 | Nakagawa | B29C 45/2673 425/139 |
| 5,702,735 | A * | 12/1997 | Martin | B29C 33/306 249/114.1 |
| 5,718,849 | A * | 2/1998 | Maus | B29C 37/0007 264/2.2 |
| 5,855,824 | A * | 1/1999 | Saito | B29C 45/40 264/2.2 |
| 5,972,252 | A * | 10/1999 | Saito | B29C 45/561 264/2.2 |
| 6,055,111 | A * | 4/2000 | Nomura | B29D 11/00413 359/642 |
| 6,270,698 | B1 * | 8/2001 | Pope | B29C 45/561 264/2.2 |
| 9,221,222 | B2 * | 12/2015 | Otsuka | B29D 11/0048 |
| 2010/0124581 | A1 * | 5/2010 | Huang | B29C 45/38 425/556 |
| 2012/0182625 | A1 * | 7/2012 | Shimizu | B29C 45/0046 359/642 |

FOREIGN PATENT DOCUMENTS

| | | |
|---|---|---|
| JP | 11-170315 | 6/1999 |
| JP | 2009-47896 | 3/2009 |
| JP | 2009-122572 | 6/2009 |
| JP | 2009-241297 | 10/2009 |
| JP | 2011-110810 | 6/2011 |
| JP | 2012-056321 | 3/2012 |
| WO | WO 2012/105693 | 8/2012 |

* cited by examiner

MOLDING DIE, OPTICAL ELEMENT MANUFACTURING METHOD, AND OPTICAL ELEMENT

RELATED APPLICATIONS

This is a U.S. National Phase Application under 35 USC 371 of International Application PCT/JP2013/073984 filed on Sep. 5, 2013.

This application claims the priority of Japanese application no. 2012-204241 filed Sep. 18, 2012, the entire content of which is hereby incorporated by reference.

TECHNICAL FIELD

The present invention relates to a molding die for molding a minute optical element, an optical element manufacturing method using the molding die, and an optical element manufactured by using the molding die.

BACKGROUND ART

As a method for releasing a molding product including an optical element which is a product portion from a molding die, a method in which an ejector pin or a core portion for forming the product portion, added to the die, is pushed out toward an opposing die side and the product portion is released with a gate portion and a runner portion, attached to this product portion, is known (refer to, for example, Patent Literature 1).

In the method of Patent Literature 1, when the product portion is minute, it is difficult to ensure a space in which the ejector pin is provided. In addition, also the configuration in which the core portion forming the product portion is pushed out has limitation in reducing a thickness or a size of the core portion in accordance with the product portion, and machining is difficult. Furthermore, even if such a core portion can be machined, rigidity of the core portion cannot be ensured, and molding with good reproducibility while the product portion is pushed out is difficult.

Moreover, there is also a method in which a projection portion formed on a flange part other than an optical surface or on a flange portion opposite to a gate portion in the optical element which is the product portion is pushed out (refer to, for example, Patent Literature 2).

In the method of Patent Literature 2, when the product portion is minute, the flange portion is also minute, and provision of the protruding portion is difficult. In addition, when the protruding portion is to be provided on the side opposite to the gate portion, in the minute product portion, after a resin is filled in the projection portion, the resin is instantaneously cooled and solidified, whereby formation of the projection portion is made difficult.

Note that there is considered a method in which the product portion is not pushed out but only the runner portion is pushed out. However, a stress is applied to the gate portion attached to the product portion at the time of pushing-out, and it is likely that bending or rupture occurs.

Furthermore, from a different point of view, in order to relax the stress applied to the gate portion of the molding product, there can be considered a method in which a thickness of the flange portion and a thickness of the gate portion are made equal, and molding surfaces for forming the flange portion and the gate portion are made flush with each other (refer to, for example, Patent Literature 1). Moreover, a shape of the gate portion is also considered to be devised so as to be suitable for releasing. For example, the shape of the gate portion can be smoothly connected from an outer side of a lens which is the product portion to the runner portion (refer to, for example, Patent Literature 3).

With the shape of the gate portion in Patent Literature 1, rigidity of the gate portion can be ensured by making the thickness of the gate portion and the thickness of the flange portion equal to each other. In addition, by making the molding surfaces of the flange portion and the gate portion, on a fixed die side, flush with each other, there is no notch (cutout) shape which might result in occurrence of a crack (split) at the time of releasing. However, in the case of the minute product portion, in the configuration in which there is no pushing-out mechanism for the product portion and the runner portion in front of the gate portion is pushed out in a direction perpendicular to a parting surface, a portion where the gate thickness begins to change in order to connect the gate portion to the runner portion is bent. As a result, there is a risk that a crack occurs in the gate portion, the gate portion is ruptured, and taking-out of the product portion becomes difficult.

With the shape of the gate portion in Patent Literature 3, the shape of the gate portion becomes wide with respect to the product portion, and gate cutting along the outer shape of the product portion becomes difficult. Namely, even if the gate cutting is performed, a part of the gate portion remains largely in many cases, and when the product portion is to be assembled to a holder or the like, restriction on a recess shape of the gate portion on the holder side becomes large.

In addition, when the molding product is pushed out, there is a method in which the product portion is pushed out in the direction perpendicular to the parting surface, and the runner portion is pushed out in a direction diagonal to the direction perpendicular to the parting surface (refer to patent Literature 4, for example). In the method of Patent Literature 4, the runner portion is pushed out along the gate portion formed by inclination to thereby cut off the product portion and the gate portion.

In the minute product portion, when a mold surface is deep, and an outer circumferential side surface of the product portion is perpendicular or substantially perpendicular to a mold mating surface, even if the runner portion is pushed out in the diagonal direction without providing a mechanism for pushing out the product portion, there is a risk that an outer circumferential portion of the product portion is caught by the die, and bending and rupture occur in the gate portion.

CITATION LIST

Patent Literature

PTL 1: Japanese Patent Laid-Open No. 2009-241297
PTL 2: Japanese Patent Laid-Open No. 2012-56321
PTL 3: Japanese Patent Laid-Open No. 58-224303
PTL 4: Japanese Patent Publication No. 07-25107

SUMMARY OF INVENTION

The present invention has an object to provide a molding die which can easily release a minute optical element in a state of favorable surface accuracy, while preventing bending or rupture of a gate portion attached to the optical element even when only a flow channel portion such as a runner portion in a molding product is pushed out.

In addition, the present invention has an object to provide an optical element manufacturing method using the molding die and an optical element manufactured by using the molding die.

In order to achieve the above-described objects, a molding die according to the present invention is a molding die including: a fixed die forming a first optical surface of an optical element and a first outer circumferential surface extending around the first optical surface and a movable die forming a second optical surface of the optical element, a second outer circumferential surface extending around the second optical surface, and an outer circumferential side surface connecting the first outer circumferential surface and the second outer circumferential surface, wherein the fixed die has a first optical transfer surface forming the first optical surface, a first outer circumferential transfer surface forming the first outer circumferential surface, a first gate-forming surface forming a gate portion, and a first flow channel-forming surface forming a flow channel portion; the movable die has a second optical transfer surface forming the second optical surface, a second outer circumferential transfer surface forming the second outer circumferential surface, a side-surface transfer surface forming the outer circumferential side surface, a second gate-forming surface forming the gate portion, and a second flow channel-forming surface forming the flow channel portion; the first and second outer circumferential transfer surfaces are a pair of surfaces parallel to mold mating surfaces of the fixed die and the movable die, and the first outer circumferential transfer surface and the first gate-forming surface are on the same plane; the fixed die and the movable die have an outer circumference-forming portion constituted by the first and second outer circumferential transfer surfaces and the side-surface transfer surface, and a gate-forming portion constituted by the first and second gate-forming surfaces; a portion connecting the outer circumference-forming portion and the gate-forming portion has an R-shape on a cross-section parallel to the mold mating surfaces; the side-surface transfer surface has a taper angle narrowing on the second outer circumferential transfer surface side; the movable die has a pushing-out mechanism for pushing out the flow channel portion of the optical element; and the pushing-out mechanism has a pushing-out pin pushing out to the first flow channel-forming surface side of the movable die at the same angle as a taper angle of a surface in the side-surface transfer surface on the second gate-forming surface side. Here, the flow channel portion is a molding portion excluding the gate portion at the root of the optical element formed by a portion for supplying a resin into a mold space forming the optical element via the gate-forming portion and includes a support shaft portion and the like, provided between the runner portion and the gate portion in addition to the runner portion.

According to the above-described molding die, by making the first outer circumferential transfer surface and the first gate-forming surface of the fixed die flush with each other, a notch shape or a step is not formed between the outer circumferential portion and the gate portion of the molding product on the fixed die side. In addition, since the portion connecting the outer circumference-forming portion and the gate-forming portion has an R-shape, concentration of a stress on the portion connecting the outer circumferential portion and the gate portion when the molding product is released can be prevented. As a result, occurrence of bending or rupture of the gate portion of the molding product in releasing can be prevented. Furthermore, bending deformation or the like of the gate portion which can occur when it is pushed out to the direction perpendicular to the mold mating surface can be prevented, by pushing out the flow channel portion at the same angle as the taper angle of the side-surface transfer surface on the second gate-forming surface side. As a result, the outer circumferential portion of the optical element is prevented from being caught by a portion on the fixed die side in the outer circumference-forming portion on a side (anti-gate side) opposite to the gate-forming portion where particularly mold release inhibition can easily occur. Particularly, since the side-surface transfer surface has the taper angle, even if only the flow channel portion is pushed out in a diagonal direction, the outer circumferential side surface is not caught by the die but the optical element can be easily released from the mold.

In a specific mode or an aspect of the present invention, the second outer circumferential transfer surface and the second gate-forming surface are on the same plane at least up to an extension line which is from a portion connecting the first outer circumferential transfer surface and the first gate-forming surface and is perpendicular to the mold mating surface, and a depth of the outer circumference-forming portion and a depth of at least the connecting portion in the gate-forming portion are equal to each other. In this case, at a position of at least the connecting portion, the outer circumferential portion to be molded and the gate portion have the same thickness, and rigidity of the gate portion can be ensured. As a result, even if the optical element which is the product portion is not directly pushed out, the optical element can be released from the mold in a state of favorable surface accuracy of the optical element. In addition, protrusion of the gate surface formed by the second gate-forming surface from the extension line of the outer circumferential surface formed by the second outer circumferential transfer surface can be prevented, even if the a position of the portion connecting the first outer circumferential transfer surface and the first gate-forming surface is cut in parallel with an optical axis.

In another aspect of the present invention, the gate-forming portion has at least any one of a depth and a width increasing as going from the outer circumference-forming portion side to a flow channel-forming portion side constituted by the flow channel-forming surface in the movable die; and a portion connecting the gate-forming portion and the flow channel-forming portion has an R-shape on a cross-section perpendicular to the mold mating surface. In this case, the thickness of the molded gate portion can be ensured, and rigidity of the gate portion can be improved.

In still another aspect of the present invention, assuming that an outer diameter of the outer circumference-forming portion is d, a width of the gate-forming portion is W, and an R radius of an R-shape is r, the following conditional expression is satisfied:

$d \leq 2.0$ mm $W \leq d/2$ $r \leq d/4$.

In this case, the molding product, and eventually, the optical element can be easily released from the mold by satisfaction of dimensions in the above-described ranges by the molding die.

In still another aspect of the present invention, a ridge portion of the outer circumference-forming portion on the second outer circumferential surface side has an R-shape on a cross-section perpendicular to the mold mating surface (surface along a flow direction of a resin). In this case, the outer circumferential portion of the optical element can be more effectively prevented from being caught by the movable die at the time of mold releasing.

In still another aspect of the present invention, the gate-forming portion has a first transfer surface extending outward from the second outer circumferential transfer surface and parallel to the mold mating surface, and a second transfer surface extending outward from the first transfer surface and inclined with respect to the first transfer surface; and a portion connecting the first transfer surface and the second transfer surface has an R-shape on a cross-section perpendicular to the mold mating surface. In this case, since the molded gate portion is inclined so as to expand toward the flow channel portion side, the gate portion can be prevented from being caught by the movable die at the time of mold releasing.

In still another aspect of the present invention, assuming that the taper angle of the side-surface transfer surface is α, the following conditional expression is satisfied:

$$0.1°≤α≤10°.$$

In order to achieve the above-described object, an optical element manufacturing method according to the present invention includes a molding process of molding a molding product by using the above-described molding die and a pushing-out process of pushing out the flow channel portion in the molding product at the same angle as a taper angle of the surface in the side-surface transfer surface on the gate-forming surface side by using the pushing-out mechanism.

According to the above-described optical element manufacturing method, the molding product, and eventually, the optical element can be easily released from the mold in a state of a favorable surface shape of the optical element without generation of bending or rupture of the gate portion, by performing molding through the use of the above-described molding die.

In order to achieve the above-described object, an optical element according to the present invention is manufactured by using the above-described molding die.

According to the above-described optical element, a notch shape is not formed in the connecting portion, by making the first outer circumferential surface and the gate surface flush with each other. In addition, since the portion connecting the outer circumferential portion and the gate portion has an R-shape, concentration of the stress to the connecting portion at the time of mold releasing can be prevented. As a result, bending or rupture of the gate portion at the time of mold releasing can be prevented. Furthermore, since the outer circumferential side surface has a taper angle, even if only the flow channel portion is pushed out in a diagonal direction, the outer circumferential side surface is not caught by the die but the optical element which can be easily released from the die can be realized.

DESCRIPTION OF EMBODIMENTS

First Embodiment

An optical element of a first embodiment according to the present invention will be described by referring to FIGS. 1A to 1D. A lens OP which is an optical element is a small-sized lens made of a resin and is used as, for example, an objective lens of an optical pickup device (specifically, a lens exclusively used for BD (Blu-ray Disc: trademark)) or a lens for an endoscope. The lens OP is obtained by cutting a gate portion GP in a molding product MP shown in FIGS. 2A to 2C.

The lens OP has an optical portion OL having an optical function and an annular outer circumferential portion FL extending from the optical portion OL to an outer diameter direction. In the lens OP, the optical portion OL has a convex first optical surface OL1 and a convex second optical surface OL2. Namely, the optical portion OL is thicker on a center side. The first optical surface OL1 and the second optical surface OL2 are generally smooth and face each other by sandwiching a body (center of the lens OP) having light permeability therebetween.

Figure 1A:
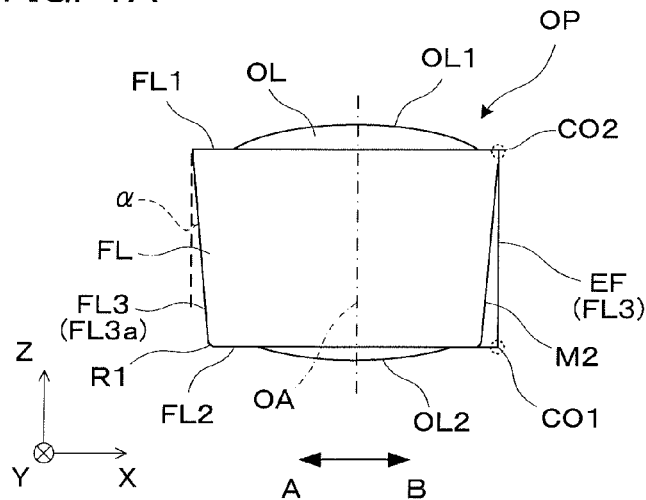
FIG. 1A is a side view of an optical element according to a first embodiment.
Figure 1D:
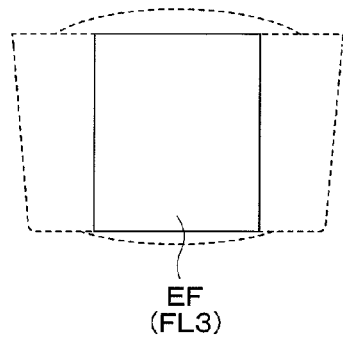
FIG. 1D is a view illustrating an end surface on a side of a gate portion.
Figure 1B:
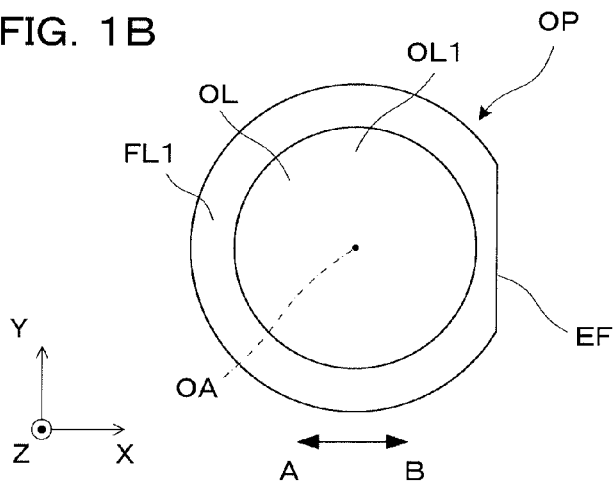
FIG. 1B is a plan view of the optical element in FIG. 1A on a side of a first optical surface.
Figure 1C:
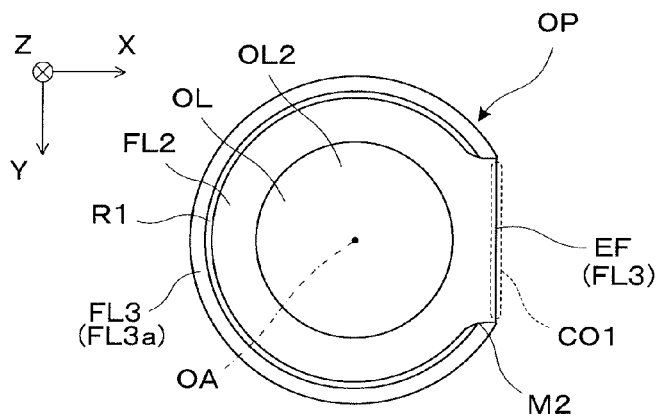
FIG. 1C is a plan view of the optical element in FIG. 1A on a side of a second optical surface.

The outer circumferential portion FL has a first outer circumferential surface FL1 on the first optical surface OL1 side, a second outer circumferential surface FL2 on the second optical surface OL2 side, and an outer circumferential side surface FL3 connecting the first and second outer circumferential surfaces FL1 and FL2. As shown in FIGS. 1A to 1C, the first and second outer circumferential surfaces FL1 and FL2 are annular surfaces extending perpendicularly to an optical axis OA and in parallel with each other, respectively. Namely, the first and second outer circumferential surfaces FL1 and FL2 are a pair of opposing surfaces perpendicular to the optical axis OA. The outer circumferential portion FL becomes a reference by, for example, the first outer circumferential surface FL1 in assembling or the like of the lens OP. The outer circumferential side surface FL3 is a cylindrical surface FL3a having a taper angle α generally narrowing on the second outer circumferential surface FL2 side with respect to the optical axis OA and has a flat rectangular end surface EF in parallel with the optical axis OA in a B-direction (right side in an AB direction) or an end in an X-direction. The taper angle α of the cylindrical surface FL3a of the outer circumferential side surface FL3 is within a range of $0.1° \leq \alpha \leq 10°$. A ridge portion R1 on the second outer circumferential surface FL2 side in the outer circumferential portion FL has an R-shape on a cross-section parallel to the optical axis OA (more specifically, a cross-section extending along the optical axis OA). Here, the ridge portion R1 of the outer circumferential portion FL is a boundary portion between the second outer circumferential surface FL2 and the outer circumferential side surface FL3. In addition, the R-shape means that a corner part has an arc shape on a cross-sectional view. By providing the R-shape on the ridge portion R1, the outer circumferential portion FL is not easily caught by a movable die 10 at the time of mold releasing. Note that the R-shape is not formed, but the R-shape can be also formed at the time of gate cutting, on a corner portion CO1 corresponding to a side portion of the end surface EF on the second optical surface OL2 side in the ridge portion R1, that is, a connecting portion between the outer circumferential portion FL and the gate portion GP before cutting the molding product MP. Similarly, the R-shape can be formed at the time of gate cutting on a corner portion CO2 on the first optical surface OL1 side.

In the present embodiment, the lens OP is cut in parallel with the optical axis OA in a state where substantially no gate portion GP is left on the basis of the outer diameter of the second outer circumferential surface FL2. Note that a portion such as the corner portion CO1 attached to the second optical surface OL2 side of the end surface EF and the like can be considered to be a mark after the gate portion GP has been removed.

Figure 2A:
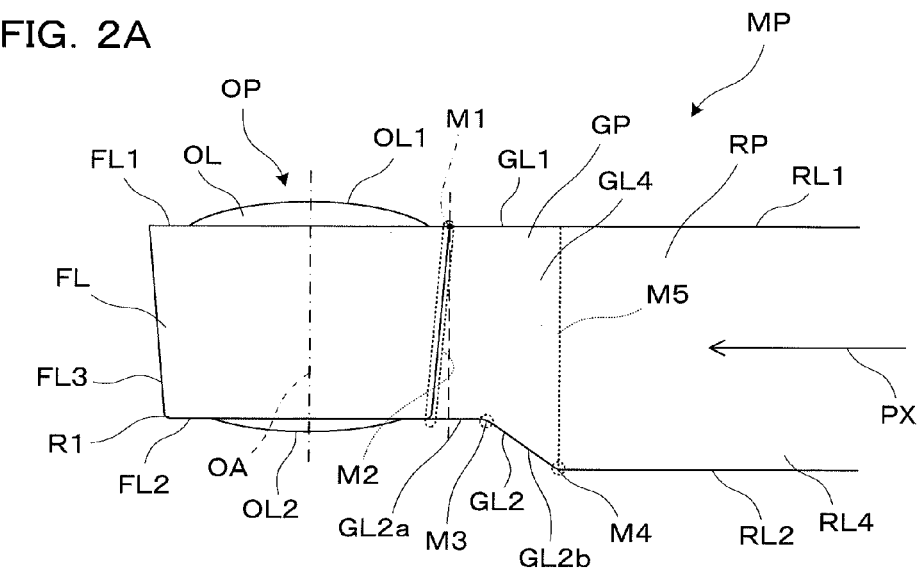
FIG. 2A is an enlarged side view of a molding product molded by a molding die according to the first embodiment.
Figure 2B:
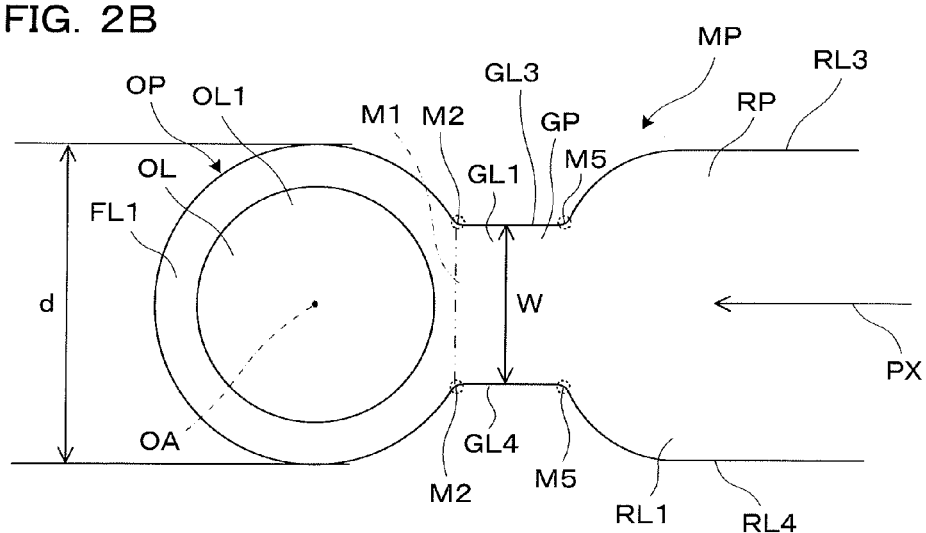
FIG. 2B is a plan view of the molding product in FIG. 2A on the first optical surface side.
Figure 2C:
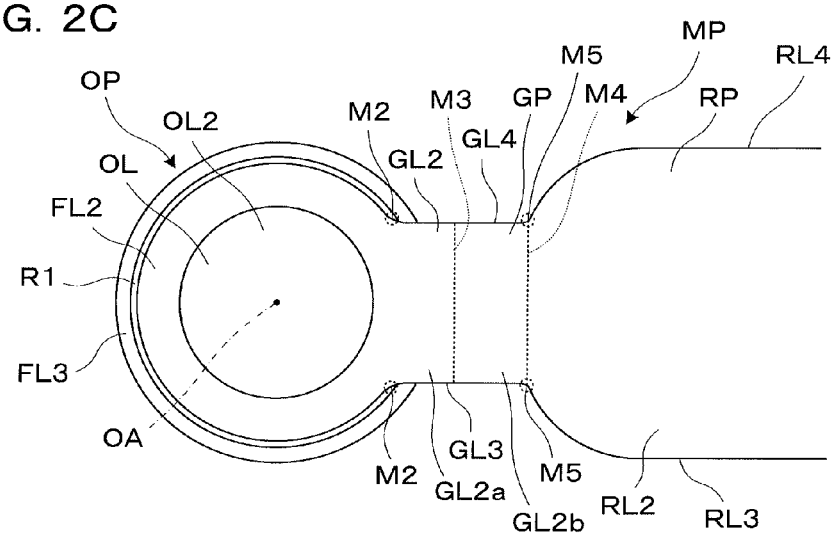
FIG. 2C is a plan view of the molding product in FIG. 2A on the second optical surface side.

As shown in FIGS. 2A to 2C, the one molding product MP has a runner portion RP which is one or more (only one is shown in the drawing for simplification) flow channel portions corresponding to the number of lenses OP, one or more gate portions GP, and one or more lenses OP. The gate portion GP is connected to the runner portion RP, and the lens OP which is the product portion is connected to the gate portion GP before cutting off the molding product MP. Note that, in the lens OP as a product shown in FIGS. 1A to 1C, the gate portion GP and the like are removed by finishing work.

The gate portion GP has a first gate surface GL1 on the first outer surface FL1 side, a second gate surface GL2 on the second outer circumferential surface FL2 side, and a pair of gate side surfaces GL3 and GL4 on the outer circumferential side surface FL3 side. As shown in FIG. 2B, the first outer circumferential surface FL1 and the first gate surface GL1 are on the same plane. As shown in FIG. 2C, the second outer circumferential surface FL2 and the second gate surface GL2 are on the same plane up to on an extension line or an extension plane (broken line in FIG. 2A) extending in parallel with the optical axis OA with a portion M1, as a base point, connecting at least the first outer circumferential surface FL1 and the first gate surface GL1, that is, on the optical axis OA side or on the A-direction side in FIG. 1A (left side in the AB direction) from this extension line. Namely, a thickness of the outer circumferential portion FL is equal at least to a product thickness in the connecting portion M1 (linear or band-shaped portion) in the gate portion GP. As shown in FIGS. 2B and 2C, a portion M2 (a linear or band-shaped portion) connecting the outer circumferential side surface FL3 and the gate side surfaces GL3 and GL4 has an R-shape on a cross-section perpendicular to the optical axis OA. The latter connecting portion M2 corresponds to a portion having a shallow cavity formed adjacent to the end surface EF in the cylindrical surface FL3a as shown in FIGS. 1A, 1C and the like.

As shown in FIGS. 2A and 2C, the second gate surface GL2 of the gate portion GP has a first surface GL2a extending outward in a radial direction from the second outer circumferential surface FL2 and perpendicular to the optical axis OA and a second surface GL2b extending further outward from the first surface GL2a and inclined with respect to the first surface GL2a. Namely, the gate portion GP increases its thickness as it goes toward the runner portion RP side from the outer circumferential portion FL side. A portion M3 (a linear or band-shaped portion) connecting the first surface GL2a and the second surface GL2b has an R-shape on a cross-section parallel to the optical axis OA (more specifically, a cross-section parallel to the optical axis OA and a molding axis PX).

The runner portion RP has a first runner surface RL1 on the first gate surface GL1 side, a second runner surface RL2 on the second gate surface GL2 side, and a pair of runner side surfaces RL3 and RL4 on the outer circumferential side surface FL3 side. The runner portion RP is a member having a prism shape or a semi-columnar shape narrowing on the gate portion GP side. As shown in FIG. 2A, the first runner surface RL1 is on the same plane as the first gate surface GL1 or has a surface on an extension of the first gate surface GL1. The second runner surface RL2 has a surface substantially parallel to the first runner surface RL1 and is connected to the second surface GL2b of the second gate surface GL2. Portions M4 and M5 (linear or band-shaped portions) connecting the gate portion GP and the runner portion RP have an R-shape on a cross-section parallel to or perpendicular to the optical axis OA. Specifically, the portion M4 connecting the second surface GL2b of the second gate surface GL2 and the second runner surface RL2 has an R-shape on a cross-section parallel to the optical axis OA (more specifically, a cross-section in parallel to the optical axis OA and the molding axis PX). In addition, the portion M5 connecting the gate side surfaces GL3 and GL4 and the runner side surfaces RL3 and RL4 has an R-shape on a cross-section perpendicular to the optical axis OA.

The molding product MP satisfies the following conditional expression, assuming that a maximum outer diameter of the outer circumferential portion FL is d, a width of the gate portion GP in a plan view is W, and an R-radius of the R-shape of the connecting portion M2 is r:

$$d \leq 2.0 \text{ mm}$$

$$W \leq d/2$$

$$r \leq d/4.$$

Figure 3:
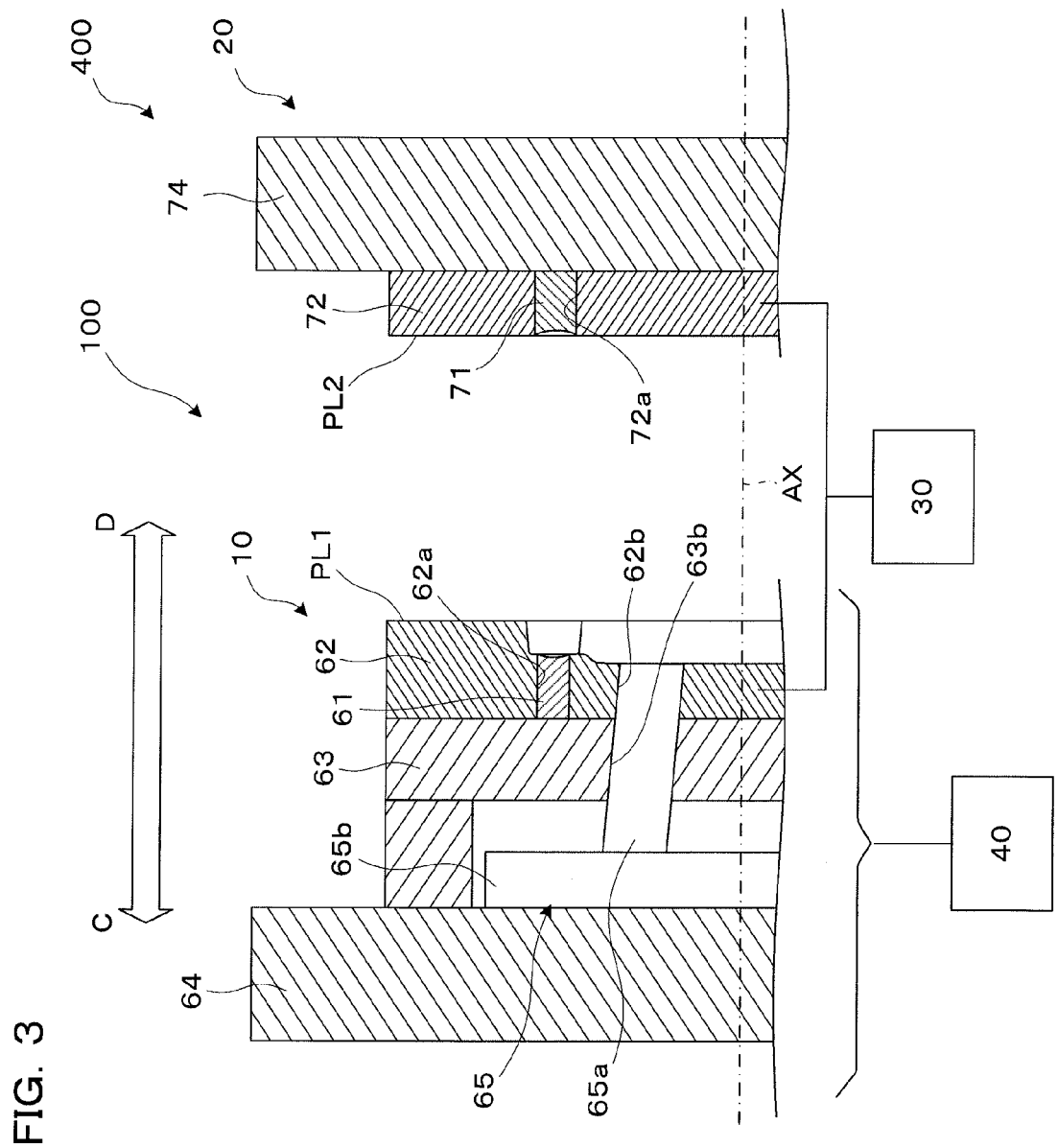
FIG. 3 is a partial side sectional view for explaining an injection molding device provided with the molding die according to the first embodiment.

Hereinafter, a molding die for molding the optical element of the present invention will be described by referring to FIGS. 3 and 4A to 4C. The molding die 100 shown in FIG. 3 is for molding the lens OP (refer to FIGS. 1A to 1C) which is the optical element by performing mold closing of the movable die 10 and the fixed die 20 to thereby form a mold space CV shown in FIG. 4A. The molding die 100 is incorporated in an injection molding device 400 including a temperature adjustment portion 30, a movable die driving portion 40, a resin injection portion (not shown) and the like.

As shown in FIG. 3, the molding die 100 includes the movable die 10 and the fixed die 20. The movable die 10 is capable of moving forward/backward in the CD direction by being driven by the movable die driving portion 40 and is capable of opening/closing operation between the fixed die 20 and itself. The mold space CV and a flow channel space FC are formed between the both dies 10 and 20 shown in FIG. 4A, by making the movable die 10 abut against the fixed die 20. The mold space CV is for forming the lens OP shown in FIGS. 1A to 1C and corresponds to the shape of the lens OP. The flow channel space FC is for supplying a resin to the mold space CV and serves as the gate portion GP and the runner portion RP in the molding product MP shown in FIGS. 2A to 2C. A molten resin is supplied to this mold space CV and filled by the resin injection portion via the flow channel space FC.

Figure 4A:
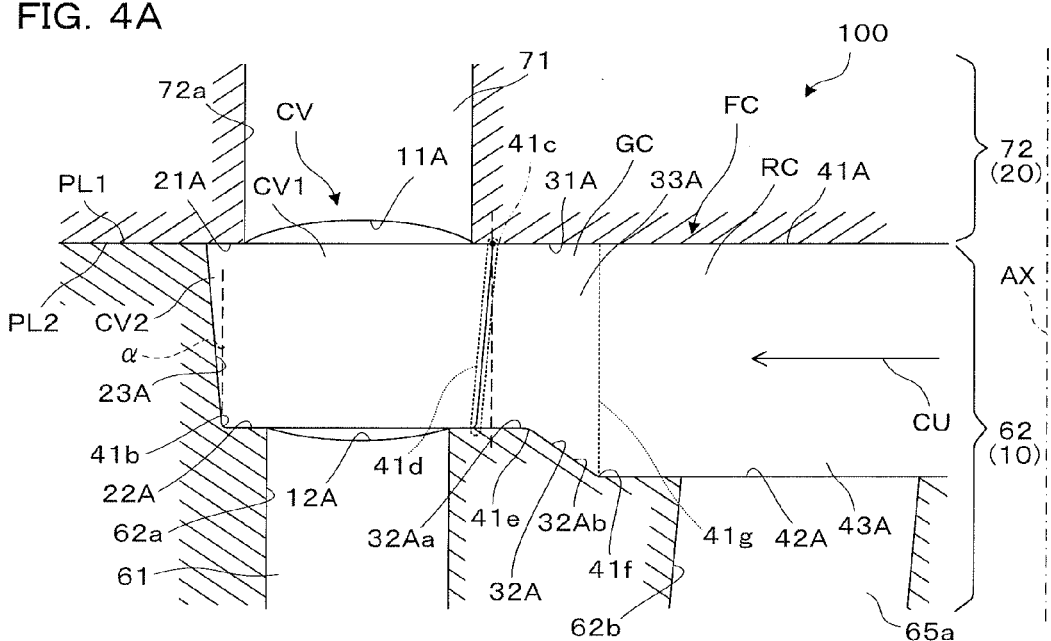
FIG. 4A is a partially enlarged sectional view of the molding die in FIG. 3.
Figure 4B:
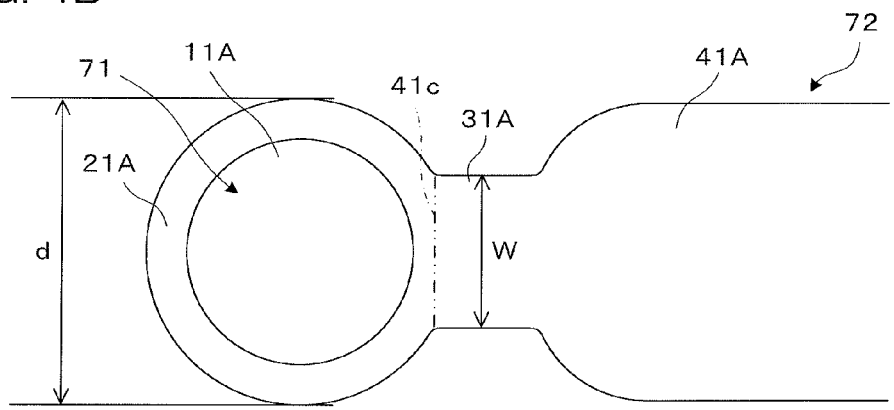
FIG. 4B is a plan view of the molding die in FIG. 4A on the first optical transfer surface side.

As shown in FIGS. 4A and 4B, the mold space CV has a body-forming portion CV1 and an outer circumference-forming portion CV2. The body-forming portion CV1 is formed by the first optical transfer surface 11A and the second optical transfer surface 12A. The outer circumference-forming portion CV2 is formed by the first outer circumferential transfer surface 21A, the second outer circumferential transfer surface 22A, and the side-surface transfer surface 23A. The first and second outer circumferential transfer surfaces 21A and 22A are a pair of surfaces parallel to mold mating surfaces PL1 and PL2 between the movable die 10 and the fixed die 20. A ridge portion 41b of the outer circumference-forming portion CV2 on the second outer circumferential transfer surface 21A side has an R-shape on a cross-section perpendicular to the mold mating surface PL1 (surface along a flow direction of the resin).

As shown in FIGS. 4A and 4B, the flow channel space FC has a gate-forming portion GC forming the gate portion GP and a runner-forming portion RC forming the runner portion RP. The gate-forming portion GC communicates with a part of the circumference of the mold space CV. The gate-forming portion GC is formed by a first gate-forming surface 31A, a second gate-forming surface 32A, and a pair of gate side surface-forming surfaces 33A and 34A. The runner-forming portion RC is formed by a first runner-forming surface 41A which is a first flow channel-forming surface, a second runner-forming surface 42A which is a second flow channel-forming surface, and a pair of runner side surface-forming surfaces 43A and 44A.

The molding die 100 satisfies the following conditional expression, assuming that a maximum outer diameter of the outer circumference-forming portion CV2 is d, a width of the gate-forming portion GC in a plan view is W, and an R-radius of the R-shape of the connecting portion 41d is r:

$d \le 2.0$ mm $W \le d/2$ $r \le d/4$.

As shown in FIG. 3, the movable die 10 in the molding die 100 has a core die 61, a die plate 62, a receiving plate 63, a mounting plate 64, and a pushing-out mechanism 65. The core die 61 and the die plate 62 are formed of, for example, the same steel material, and are mutually fixed integrally. Namely, the core die 61 of the movable die 10 is inserted into and fixed to a hole 62a provided in the die plate 62. In the die plate 62, a hole 62b into which a pushing-out pin 65a of the pushing-out mechanism 65 which will be described later is inserted is formed. The pushing-out pin 65a advances/retreats at appropriate timing in synchronization with an operation of the die plate 62 that advances/retreats in the CD direction by being driven through the movable die-driving portion 40.

Figure 4C:
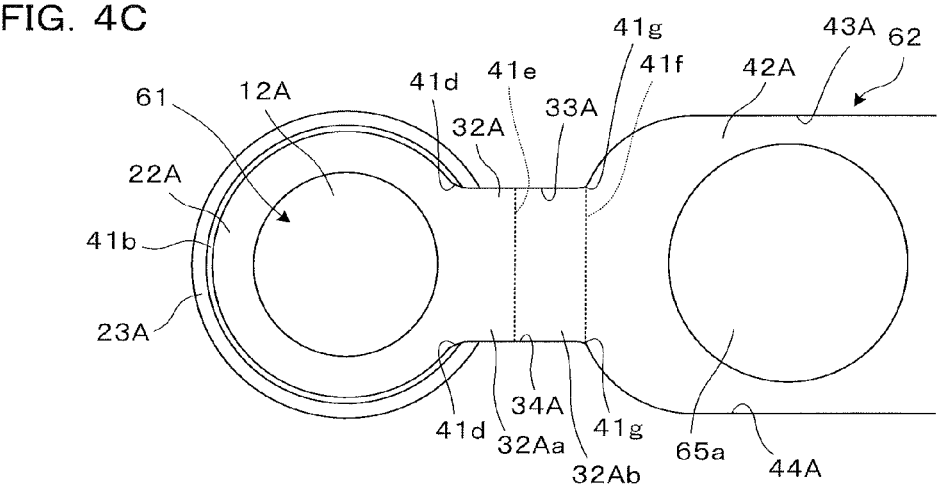
FIG. 4C is a plan view of the molding die in FIG. 4A on the second optical transfer surface side.

As shown in FIGS. 4A and 4C, the core die 61 in the movable die 10 has the second optical transfer surface 12A with a generally smooth concave surface. The second optical transfer surface 12A corresponds to the second optical surface OL2 of the lens OP in the molding product MP (refer to FIGS. 1A to 1C). On the other hand, the second outer circumferential transfer surface 22A and the side-surface transfer surface 23A on the circumferential side formed by the die plate 62 correspond to the second outer circumferential surface FL2 and the outer circumferential side surface FL3 of the lens OP on the circumferential side (refer to FIGS. 1A to 1C), respectively. The second outer circumferential transfer surface 22A and the second gate-forming surface 32A of the movable die 10 are on the same plane at least up to an extension line or extension plane (a broken line in FIG. 4A) perpendicular to the mold mating surface PL1 of a portion 41c connecting at least the first outer circumferential transfer surface 21A on the fixed die 20 side and the first gate-forming surface 31A. Namely, the depth of the outer circumference-forming portion CV2 and the depth of at least the connecting portion 41c in the gate-forming portion GC are equal to each other. In the movable die 10, a portion 41d connecting the side-surface transfer surface 23A of the outer circumference-forming portion CV2 and the gate side surface-forming surfaces 33A and 34A of the gate-forming portion GC has an R-shape on a cross-section parallel to the mold mating surface PL1. The side-surface transfer surface 23A has a taper angle α narrowing on the second outer circumferential transfer surface 22A side with respect to the axis AX (FIG. 3) perpendicular to the mold mating surface PL1. The taper angle α is within a range of $0.1° \le \alpha \le 10°$. The second gate-forming surface 32A of the gate-forming portion GC has a first transfer surface 32Aa extending outward from the second outer circumferential surface 22A and parallel to the mold mating surface PL1, and a second transfer surface 32Ab extending outward from the first transfer surface 32Aa and inclined with respect to the first transfer surface 32Aa. Namely, in the movable die 10, the gate-forming portion GC has a depth increasing as going from the outer circumference-forming portion CV2 side toward the runner-forming portion RC side. A portion 41e connecting the first transfer surface 32Aa and the second transfer surface 32Ab has an R-shape on a cross-section perpendicular to the mold mating surface PL1 (more specifically, a cross-section perpendicular to the mold mating surface PL1 and along a flowing direction CU).

The portion connecting the gate-forming portion GC and the runner-forming portion RC has an R-shape on a cross-section perpendicular to or parallel to the mold mating surface PL1. Specifically, a portion 41f connecting the second transfer surface 32Ab of the second gate-forming surface 32A and the second runner-forming surface 42A has an R-shape on a cross-section perpendicular to the mold mating surface PL1 (more specifically, a cross-section perpendicular to the mold mating surface PL1 and along a flowing direction CU). In addition, a portion 41g connecting the gate side surface-forming surfaces 33A and 34A and the runner side surface-forming surfaces 43A and 44A has an R-shape on a cross-section parallel to the mold mating surface PL1.

As shown in FIG. 3, the receiving plate 63 supports the die plate 62 from behind. The mounting plate 64 supports the receiving plate 63 from behind. In the receiving plate 63, a hole 63b into which the pushing-out pin 65a of the pushing-out mechanism 65 which will be described later is inserted is formed.

The pushing-out mechanism 65 is for pushing out the runner portion RP of the molding product MP from the movable die 10. As shown in FIGS. 3, 4A, and 4C, the pushing-out mechanism 65 includes the pushing-out pin 65a for pushing out the runner portion RP from the diagonal direction with respect to the mold mating surface PL1 or the axis AX, and an advancing/retreating member 65b for advancing/retreating the pushing-out pin 65a. The pushing-out pin 65a is inserted into the holes 62b and 63b respectively formed in the mold plate 62 and the receiving plate 63, so as to be capable of being advanced/retreated. A tip end of the pushing-out pin 65a is arranged close to the second runner-forming surface 42A, or preferably close to the second gate-forming surface 32A of the second runner-forming surface 42A. The pushing-out pin 65a is driven by the advancing advancing/retreating member 65b and advances toward the fixed die 20 side, and is automatically retreated along with retreat of the advancing/retreating member 65b and is returned to the original position. The advancing/retreating member 65b is driven by an advancing/retreating driving device not shown, and is advanced/retreated in the CD direction parallel to the axis AX at appropriate timing and in an appropriate amount. At the time of mold releasing of the lens OP, the pushing-out pin 65a of the pushing-out mechanism 65 is pushed out from the second runner-forming surface 42A of the movable die 10 at the same angle as the taper angle α on the surface in the side-surface transfer surface 23A on the second gate-forming surface 32A side.

As shown in FIG. 3, the fixed die 20 has a core die 71, a die plate 72, and a mounting plate 74. The core die 71 and the die plate 72 are formed of, for example, the same steel material, and are mutually fixed integrally. Namely, the core die 71 of the fixed die 20 is inserted into and fixed to a hole 72a provided in the die plate 72.

As shown in FIGS. 4A and 4B, the core die 71 in the fixed die 20 has the first optical transfer surface 11A with a smooth concave surface on a side facing the movable die 10. The first optical transfer surface 11A corresponds to the first optical surface OL1 of the lens OP in the molding product MP (refer to FIGS. 1A to 1C). On the other hand, the first outer circumferential transfer surface 21A on the circumferential side formed by the die plate 72 corresponds to the first outer circumferential surface FL1 of the lens OP on the circumferential side (refer to FIGS. 1A to 1C). The first outer circumferential transfer surface 21A and the first gate-forming surface 31A of the fixed mold 20 are on the same plane. In addition, the first gate-forming surface 31A and the first runner-forming surface 41A are on the same plane.

The mounting plate 74 supports the mold plate 72 from behind. The mold plate 72 supported by the mounting plate 74 is maintained in a fixed state unlike the molding plate 62 of the movable die 10. Note that a sprue bushing (not shown) and the like are mounted on a side of a supply source of a molten resin, on an outside of the mounting plate 74.

Hereinafter, a manufacturing method of the lens OP will be described.

Figure 5A:
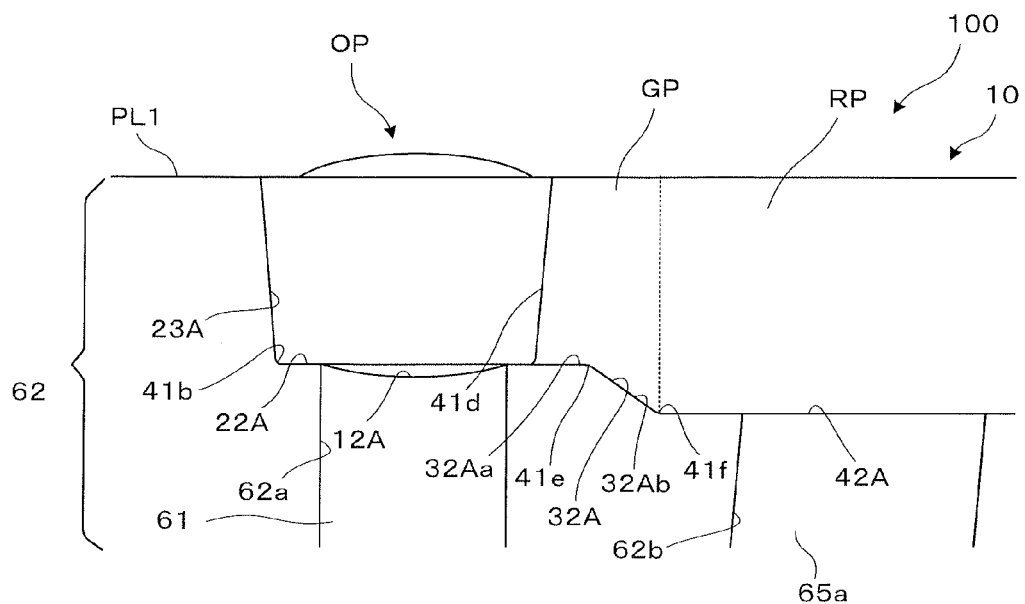
FIG. 5A is a conceptual view for explaining a state where the molding product has been released from a fixed die.
Figure 5B:
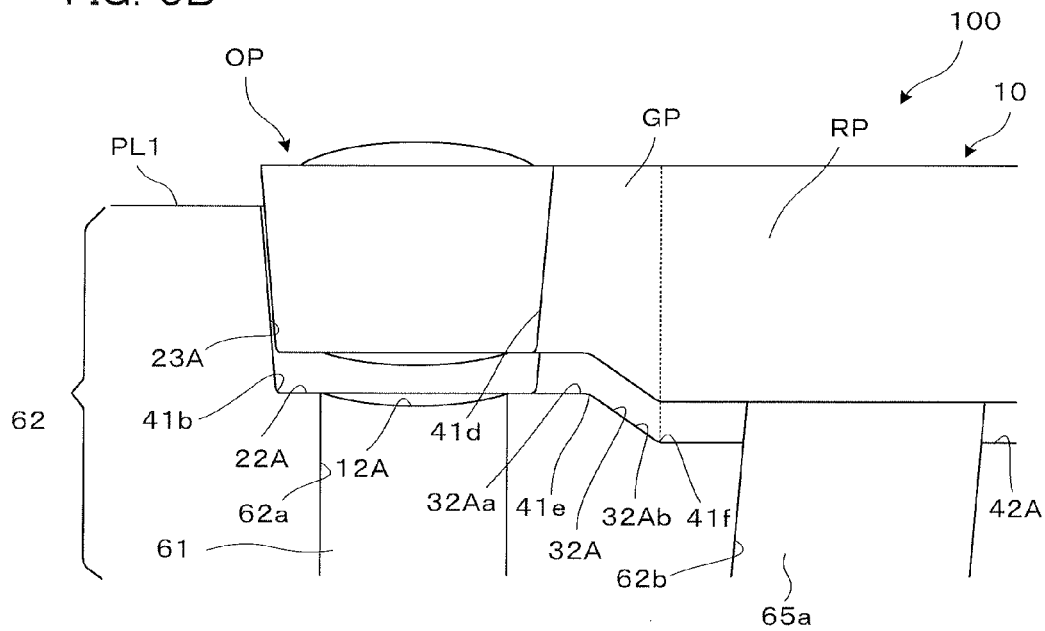
FIG. 5B is a conceptual view for explaining a state where the molding product is being released from the movable die.

First, the movable die 10 and the fixed die 20 are appropriately heated by the temperature adjustment portion 30 not shown. As a result, in the both dies 10 and 20, the temperature of the mold portion forming the mold space CV and the flow channel space FC is put into a temperature state suitable for molding. Subsequently, the movable die driving portion 40 is operated, and the movable die 10 is advanced to the fixed die 20 side to thereby be put into a mold closing state. Mold tighening in which the movable die 10 and the fixed die 20 are closed at a required pressure is performed by further continuing the closed state of the movable die driving portion 40. Subsequently, the resin injection portion not shown is operated, and a molten resin is filled in the mold space CV via the flow channel space FC. After that, in a state where the pressure in the mold space CV is kept, the molten resin is gradually cooled by heat radiation and solidified. Then, the movable die driving portion 40 is operated, the tightened movable die 10 is retreated, and mold opening in which the movable die 10 is separated away from the fixed die 20 is performed. As a result, the molding product MP is, as shown in FIG. 5A, released from the fixed die 20 in a state of being held by the movable die 10. Next, the advancing/retreating driving device not shown is operated so as to perform pushing out of the runner portion RP. At this time, as shown in FIG. 5B, the pushing-out pin 65a is pushed out from the second runner-forming surface 42A at the same angle as the taper angle α of the surface on the second gate-forming surface 32A side in the side-surface transfer surface 23A of the movable die 10 via the advancing/retreating member 65b of the pushing-out mechanism 65. As a result, the lens OP is released from the movable die 10. Note that the lens OP released from the both dies 10 and 20 is carried out to the outside of the injection molding device 400 by gripping a sprue portion or the like (not shown) extending from the runner portion RP. Furthermore, the lens OP after being carried out is subjected to outline machining such as removal of the gate portion GP and is made into a product for shipment.

According to the molding die 100 and the like described above, by making the first outer circumferential transfer surface 21A of the fixed die 20 and the first gate-forming surface 31A flush with each other, a notch shape is not formed on the portion M1 connecting the outer circumferential portion FL on the fixed die 20 side of the molding product MP and the gate portion GP. In addition, at least on the connecting portion M1, the molded outer circumferential portion FL and the gate portion GP have the same thickness, and rigidity of the gate portion GP can be ensured. As a result, even if the lens OP which is the product portion is not directly pushed out, the lens OP can be released from the movable die 10 in a state of favorable surface accuracy of the lens OP. In addition, since the portion 41d connecting the outer circumference-forming portion CV2 and the gate-forming portion GC has an R-shape, concentration of stress on the portion M2 connecting the outer circumferential portion FL and the gate portion GP at the time of mold releasing of the molding product MP can be prevented. As a result, occurrence of bending or rupture of the gate portion GP of the molding product MP at the time of mold releasing can be prevented. Furthermore, by pushing out the runner portion RP at the same angle as the taper angle α on the second gate-forming surface 32A side of the side-surface transfer surface 23A, bending deformation or the like of the gate portion GP which can occur when the runner portion RP is pushed out to the direction perpendicular to the mold mating surface PL1 can be prevented. As a result, the outer circumferential portion FL of the lens OP is prevented from being caught by a portion on the fixed die 20 side where particularly mold release inhibition can easily occur, in the outer circumference-forming portion CV2 on the side (anti-gate side) opposite to the gate-forming portion GC. Particularly, since the side-surface transfer surface 23A has the taper angle α, even if only the runner portion RP is pushed out in a diagonal direction, the outer circumferential side surface FL3 is not caught by the movable die 10 but the lens OP can be easily released from the movable die 10.

Second Embodiment

Hereinafter, a molding die and the like of a second embodiment will be described. The molding die and the like of the second embodiment are a modification of the molding die and the like of the first embodiment, and the matters not particularly described are similar to those in the first embodiment.

Figure 6A:
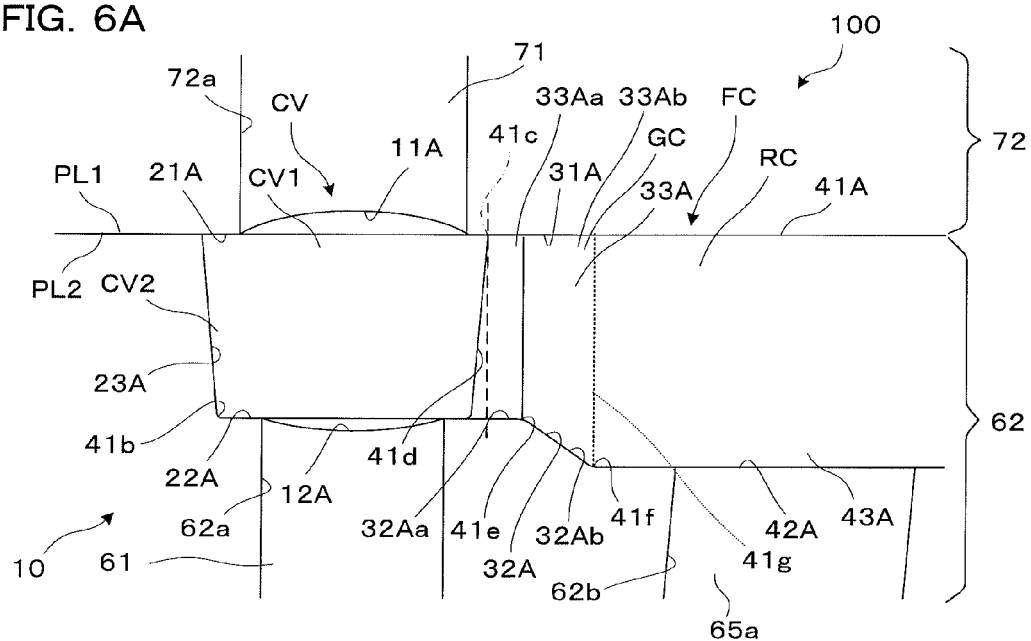
FIGS. 6A and 6B are views for explaining a molding die for molding an optical element according to a second embodiment.
Figure 6B:
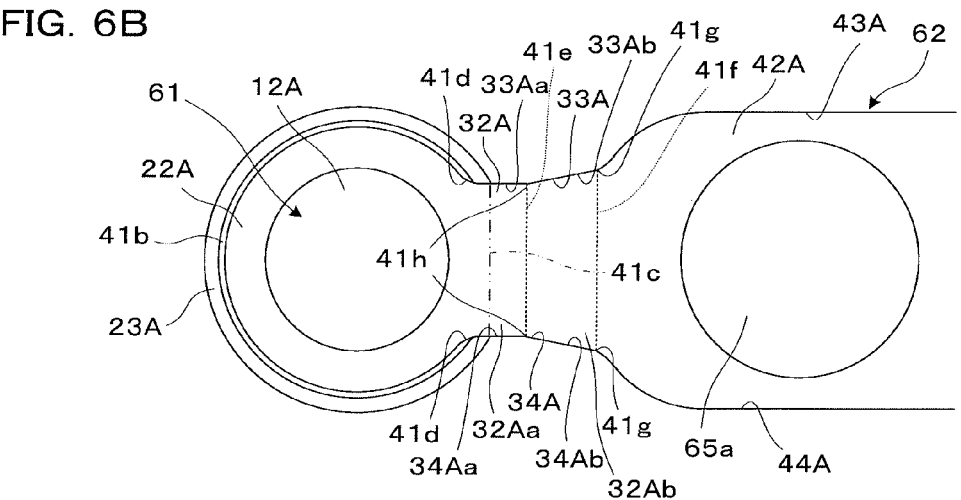

As shown in FIGS. 6A and 6B, in the movable die 10, the second gate-forming surface 32A of the gate-forming portion GC has the first transfer surface 32Aa extending outward from the second outer circumferential transfer surface 22A and parallel to the mold mating surface PL1, and the second transfer surface 32Ab extending outward from the first transfer surface 32Aa and inclined to the first transfer surface 32Aa. Furthermore, the gate side surface-forming surfaces 33A and 34A of the gate-forming portion GC have third transfer surfaces 33Aa and 34Aa extending outward from the side-surface transfer surface 23A and perpendicular to the portion 41c connecting the mold mating surface PL1 and the first outer circumferential transfer surface 21A as well as the first gate-forming surface 31A, and fourth transfer surfaces 33Ab and 34Ab extending outward from the third transfer surfaces 33Aa and 34Aa and inclined to the third transfer surfaces 33Aa and 34Aa, respectively. Namely, in the movable die 10, the gate-forming portion GC has its depth and width increasing as going from the outer circumference-forming portion CV2 side toward the runner-forming portion RC side. A portion 41h connecting the third transfer surfaces 33Aa and 34Aa and the fourth transfer surfaces 33Ab and 34Ab has also an R-shape on a cross-section parallel to the mold mating surface PL1, respectively.

Figure 6C:
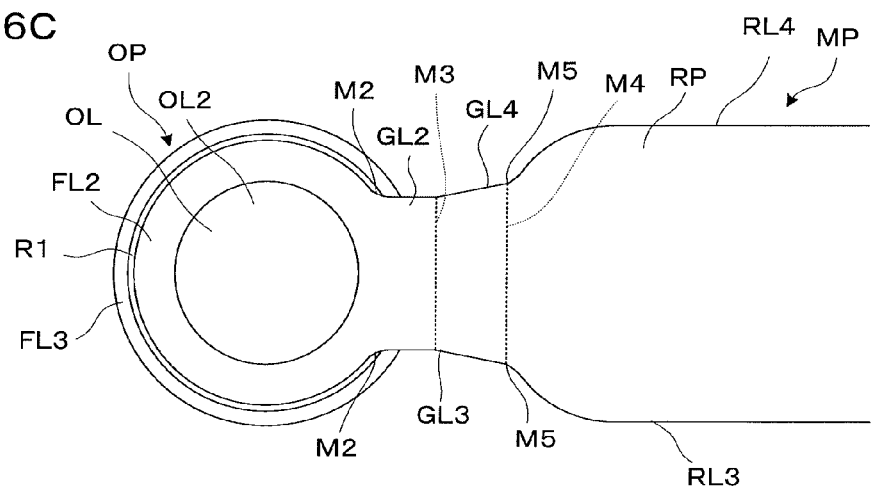
FIG. 6C is a view for explaining a molding product molded by using the molding die in FIGS. 6A and 6B.

As shown in FIG. 6C, in the molding product MP molded by the molding die 100 shown in FIGS. 6A and 6B, the gate portion GP has its thickness and width increasing as going from the outer circumferential portion FL side toward the runner portion RP side.

Third Embodiment

Hereinafter, a molding die and the like of a third embodiment will be described. The molding die and the like of the third embodiment are a modification of the molding die and the like of the first embodiment, and the matters not particularly described are similar to those in the first embodiment.

Figure 7A:
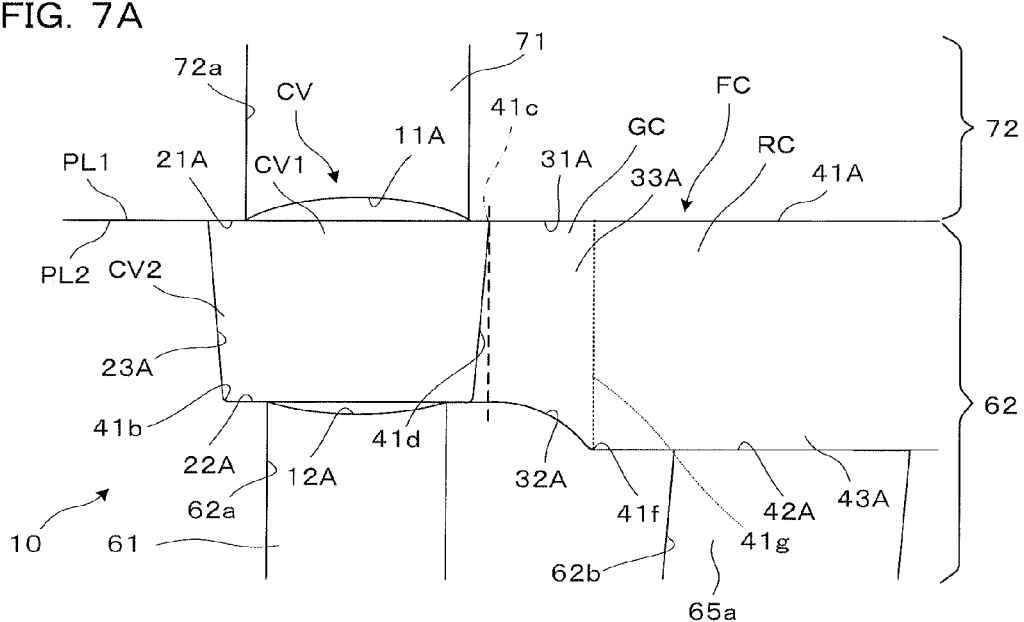
FIGS. 7A and 7B are views for explaining a molding die for molding an optical element according to a third embodiment.
Figure 7B:
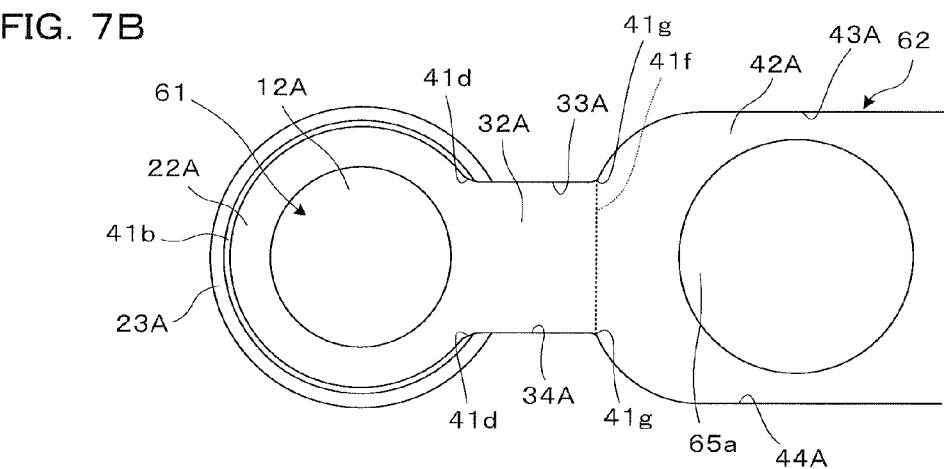

As shown in FIGS. 7A and 7B, in the movable die 10, the second gate-forming surface 32A of the gate-forming portion GC has a gentle curved surface from the second outer circumferential transfer surface 22A side to the second runner-forming surface 42A side. Namely, in the movable die 10, the gate-forming portion GC has its depth increasing as going from the outer circumference-forming portion CV2 side toward the runner-forming portion RC side.

Figure 7C:
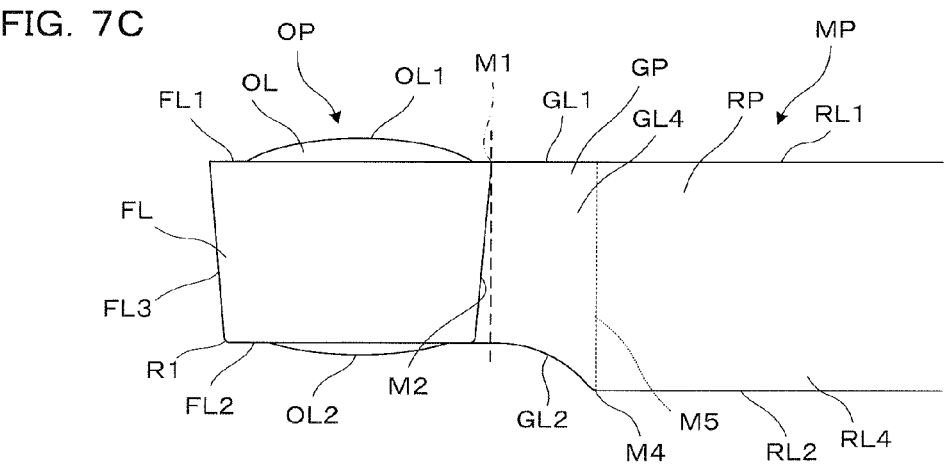
FIG. 7C is a view for explaining a molding product molded by using the molding die in FIGS. 7A and 7B.

As shown in FIG. 7C, the molding product MP molded by the molding die 100 shown in FIGS. 7A and 7B has the second gate surface GL2 formed as a gentle curved surface with the thickness increasing as going from the outer circumferential portion FL side toward the runner portion RP side in the gate portion GP.

Fourth Embodiment

Hereinafter, a molding die and the like of a fourth embodiment will be described. The molding die and the like of the fourth embodiment are a modification of the molding die and the like of the first embodiment, and the matters not particularly described are similar to those in the first embodiment.

Figure 8A:
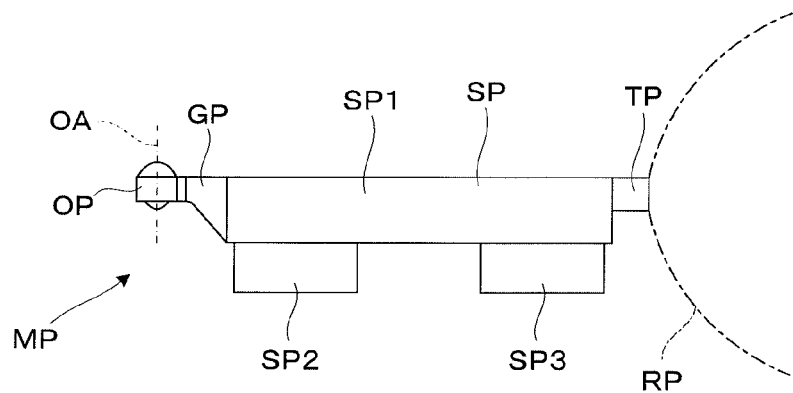
FIGS. 8A and 8B are views for explaining a molding product including an optical element according to a fourth embodiment.
Figure 8B:
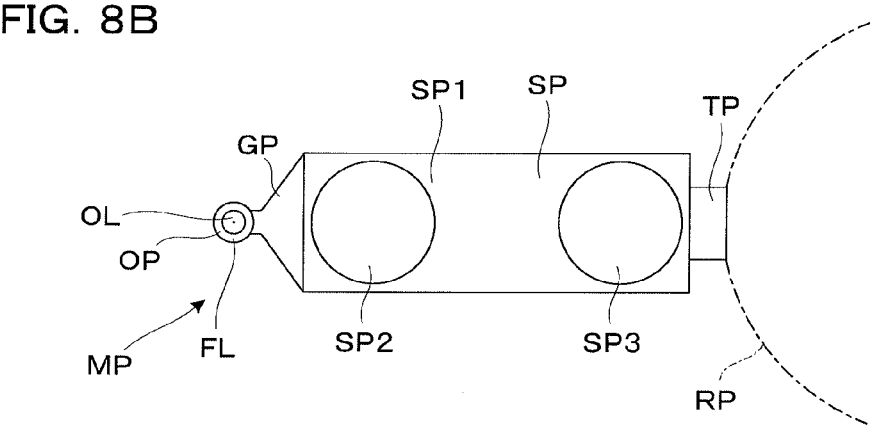

As shown in FIGS. 8A and 8B, the molding product MP has a support shaft portion SP and a sub gate portion TP between the gate portion GP and the runner portion RP. In the present embodiment, the flow channel portion serves as the runner portion RP, the support shaft portion SP, and the sub gate portion TP. The support shaft portion SP is for fixing the molding product MP to, for example, a support jig (not shown). The support shaft portion SP has a body portion SP1 and reference portions SP2 and SP3. The reference portions SP2 and SP3 are used for alignment when the molding product MP is fixed to the support jig. The sub gate portion TP is a portion connecting the runner portion RP and the support shaft portion SP, and cutting is carried out on this sub gate portion TP when the sub gate portion TP is used for measurement of, for example, an optical molding product. Note that the support jig is mounted on a measurement device of the optical molding product or the like.

Figure 8C:
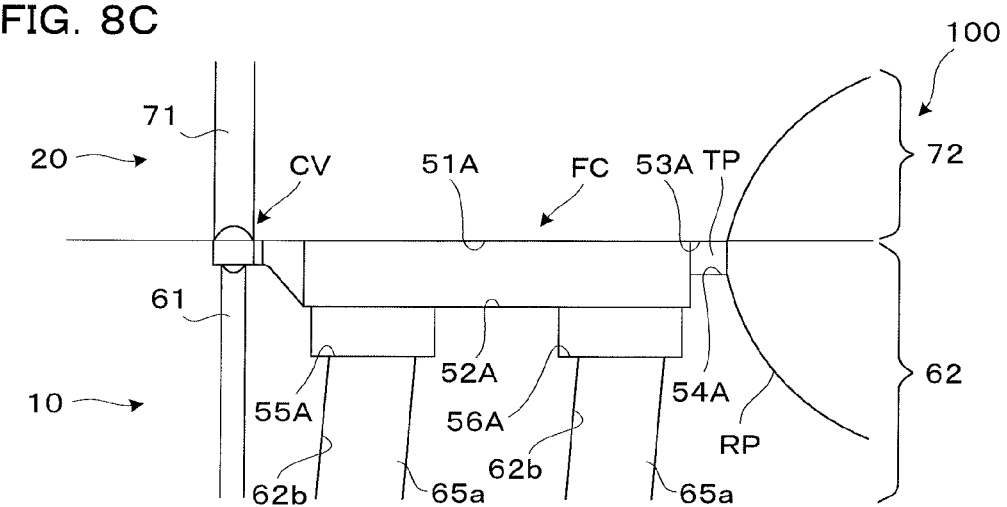
FIG. 8C is a view for explaining a molding die for molding an optical element in FIGS. 8A and 8B.

As shown in FIG. 8C, the molding die 100 has flow channel-forming surfaces 51A and 52A corresponding to the shape of the above-described support shaft portion SP of the molding product MP and for forming the support shaft portion SP, and flow channel-forming surfaces 53A and 54A corresponding to the shape of the sub gate portion TP and for forming the sub gate portion TP. In the present embodiment, the flow channel-forming surface 51A on the fixed die 20 side forming the support shaft portion SP is the first flow channel-forming surface, and the flow channel-forming surface 52A on the movable die 10 side is the second flow channel-forming surface. Reference portion forming surfaces 55A and 56A forming the reference portions SP2 and SP3 of the support shaft portion SP are provided on the flow channel-forming surface 52A. The pushing-out pin 65a for pushing out the support shaft portion SP is provided on the movable die 10 so as to push out the reference portions SP2 and SP3 of the support shaft portion SP of the molding product MP, that is, so as to push out from the reference portion forming surfaces 55A and 56A.

Hereinbefore, the molding die according to the present embodiment has been described, but the molding die and the like according to the present invention are not limited to those described above. For example, the shape of the lens OP is exemplification, and the shapes of the optical surfaces OL1, OL2 and the like can be appropriately modified in accordance with applications.

Figure 9A:
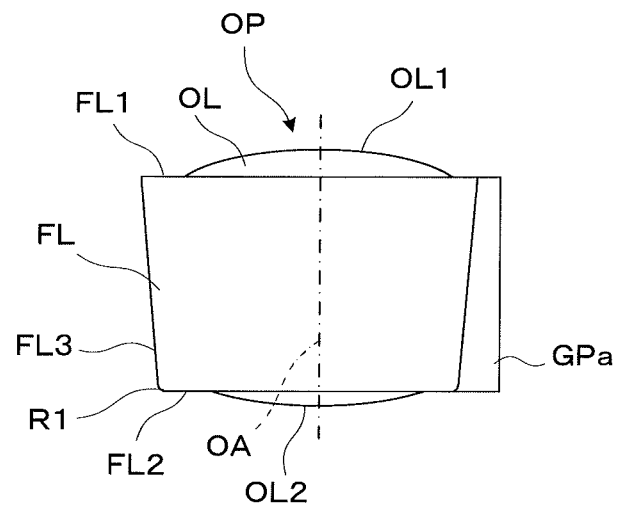
FIGS. 9A and 9B are views for explaining a modification of the optical element.
Figure 9B:
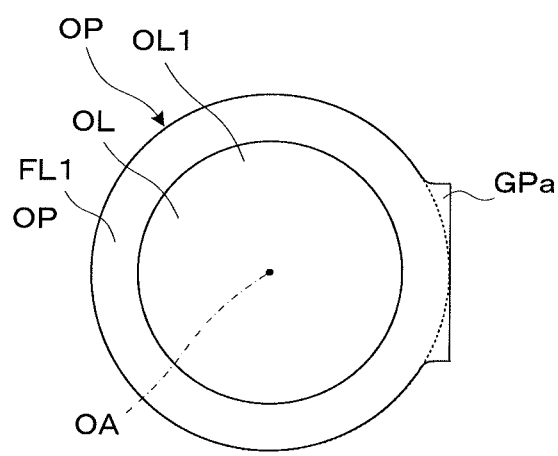

In addition, in the above-described embodiment, the lens OP is cut off in parallel with the optical axis OA and perpendicularly to the molding shaft PX on the basis of the outer diameter of the second outer circumferential surface FL2 in a state where substantially no gate portion GP is left, but as shown in FIGS. 9A and 9B, the gate portion GP may be cut off in a state where a part of the gate portion GP (gate remaining portion GPa) is left. Furthermore, the gate portion GP may be cut off or cut so as to be inclined with respect to the optical axis OA along the outer circumferential side surface FL3.

A boundary between the second gate surface GL2 and a pair of gate side surfaces GL3 and GL4 sandwiching the same can be made an R-shape.

The angle at which the runner portion RP is pushed out by the pushing-out pin 65a may not be accurately the same as the taper angle α of the side-surface transfer surface 23A on the second gate-forming surface 32A side but may have somewhat angle difference, and this case is also considered to be the same angle.

The invention claimed is:

1. A method for manufacturing an optical element with molding by using a molding die having a fixed die and a movable die, wherein the method comprises:
    providing the fixed die for forming a first optical surface of an optical element and a first outer circumferential surface extending around the first optical surface;
    providing the movable die for forming a second optical surface of the optical element, a second outer circumferential surface extending around the second optical surface, and an outer circumferential side surface connecting the first outer circumferential surface and the second outer circumferential surface,
    wherein:
    the fixed die has a first optical transfer surface forming the first optical surface, a first outer circumferential transfer surface forming the first outer circumferential surface, a first gate-forming surface forming a gate portion, and a first flow channel-forming surface forming a flow channel portion;
    the movable die has a second optical transfer surface forming the second optical surface, a second outer circumferential transfer surface forming the second outer circumferential surface, a side-surface transfer surface forming the outer circumferential side surface, a second gate-forming surface forming the gate portion, and a second flow channel-forming surface forming the flow channel portion;
    the first and second outer circumferential transfer surfaces are a pair of surfaces parallel to mold mating surfaces of the fixed die and the movable die, and the first outer circumferential transfer surface and the first gate-forming surface are on the same plane;
    the fixed die and the movable die have an outer circumference-forming portion constituted by the first and second outer circumferential transfer surfaces and the side-surface transfer surface, and a gate-forming portion constituted by the first and second gate-forming surfaces;
    a portion connecting the outer circumference-forming portion and the gate-forming portion has an R-shape on a cross-section parallel to the mold mating surfaces;
    the side-surface transfer surface has a taper angle narrowing on the second outer circumferential transfer surface side;
    the movable die has a pushing-out mechanism for pushing out the flow channel portion of the optical element; and
    the pushing-out mechanism has a pushing-out pin pushing out to the first flow channel-forming surface side of the movable die at the same angle as a taper angle of a surface in the side-surface transfer surface on the second gate-forming surface side.

2. The method for manufacturing an optical element according to claim 1, comprising pushing out the flow channel portion in the molding product at the same angle as a taper angle of the surface in the side-surface transfer surface on the gate-forming surface side by using the pushing-out mechanism.

3. The method for manufacturing an optical element according to claim 1, wherein the second outer circumferential transfer surface and the second gate-forming surface are on the same plane at least up to an extension line which is from a portion connecting the first outer circumferential transfer surface and the first gate-forming surface and is perpendicular to the mold mating surface, and a depth of the outer circumference-forming portion and a depth of at least the connecting portion in the gate-forming portion are equal to each other.

4. The method for manufacturing an optical element according to claim 1, wherein:
    the gate-forming portion has at least any one of a depth and a width increasing as going from the outer circumference-forming portion side to a flow channel-forming portion side constituted by the flow channel-forming surface in the movable die; and
    a portion connecting the gate-forming portion and the flow channel-forming portion has an R-shape on a cross-section perpendicular to the mold mating surface.

5. The method for manufacturing an optical element according to claim 1, wherein assuming that an outer diameter of the outer circumference-forming portion is d, a width of the gate-forming portion is W, and an R radius of the R-shape is r, the following conditional expression is satisfied:

$$d \leq 2.0 \text{ mm}$$

$$W \leq d/2$$

$$r \leq d/4.$$

6. The method for manufacturing an optical element according to claim 1, wherein a ridge portion of the outer circumference-forming portion on the second outer circumferential surface side has an R-shape on a cross-section perpendicular to the mold mating surface.

7. The method for manufacturing an optical element according to claim 1, wherein:
    the gate-forming portion has a first transfer surface extending outward from the second outer circumferential transfer surface and parallel to the mold mating surface, and a second transfer surface extending outward from the first transfer surface and inclined with respect to the first transfer surface; and
    a portion connecting the first transfer surface and the second transfer surface has an R-shape on a cross-section perpendicular to the mold mating surface.

8. The method for manufacturing an optical element according to claim 1, wherein assuming that the taper angle of the side-surface transfer surface is a, the following conditional expression is satisfied:

$$0.1° \leq s \leq 10°.$$

* * * * *